April 2, 1940.  G. A. GASE  2,196,067

METHOD AND APPARATUS FOR ROUGH SURFACING BRICK

Filed July 2, 1936  2 Sheets-Sheet 1

INVENTOR.
GEORGE A. GASE
BY
Kwis Hudson & Kent
ATTORNEYS

April 2, 1940.  G. A. GASE  2,196,067

METHOD AND APPARATUS FOR ROUGH SURFACING BRICK

Filed July 2, 1936  2 Sheets-Sheet 2

INVENTOR.
GEORGE A. GASE
BY
Kwis Hudson & Kent
ATTORNEYS

Patented Apr. 2, 1940

2,196,067

UNITED STATES PATENT OFFICE 2,196,067

METHOD AND APPARATUS FOR ROUGH SURFACING BRICK

George A. Gase, Cleveland, Ohio, assignor of forty per cent to Hector J. Boiardi, Cleveland, Ohio Application July 2, 1936, Serial No. 88,616

4 Claims. (Cl. 25—1)

This invention relates to a method and apparatus for rough surfacing brick, that is to say for imparting to one or more surfaces of a brick a texture somewhat of the character of rough hewn stone. Several methods have been devised heretofore for imparting rough textures to brick, but brick produced by such methods generally bear tool marks in regularly recurring order, in other words the roughening impresses the observer at once as having been produced in a mechanical way, whereas the surface obtained by the present invention resembles a fractured surface, and deflects light in all directions producing an artistic effect. Substantially no tool marks remain, and those which do occasionally appear are almost invisible and do not recur in any regular order.

One of the objects of the invention is the provision of rough brick surfaces of a natural, as distinguished from an artificial, appearance.

Another object is the provision of a novel method of obtaining such a surface and a novel apparatus for carrying out the method.

Figure 1:
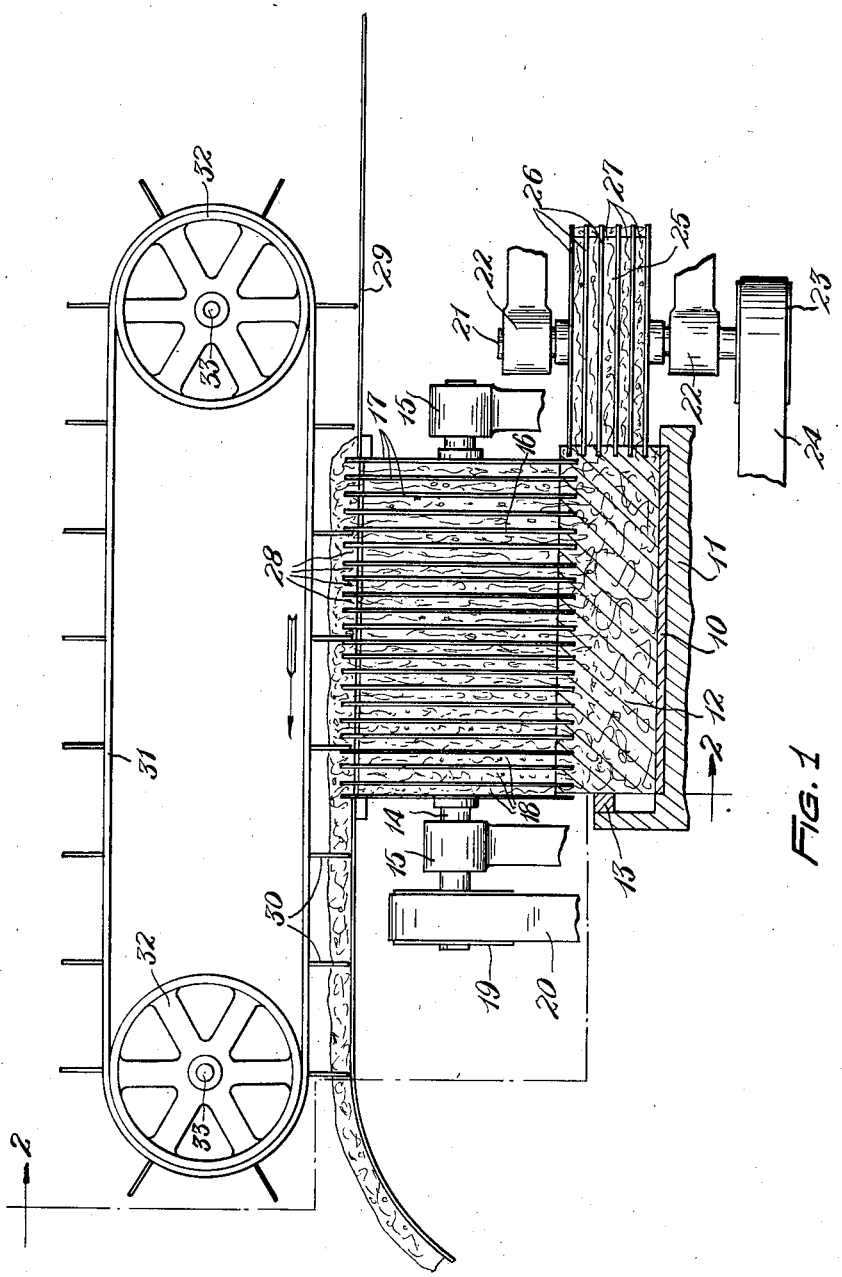
Figure 2:
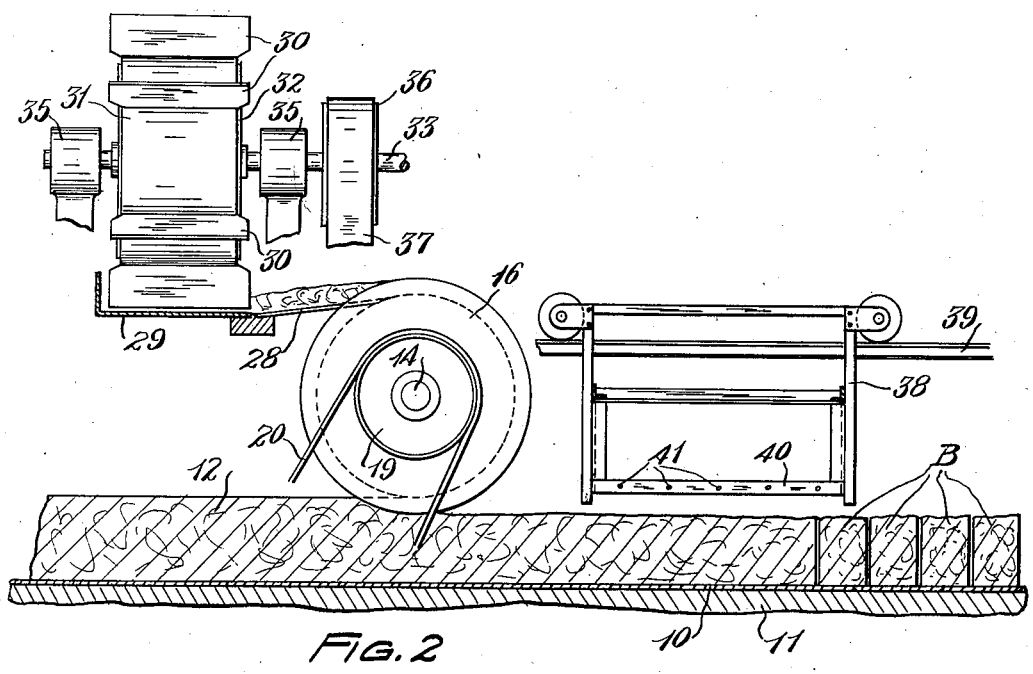
Figure 3:
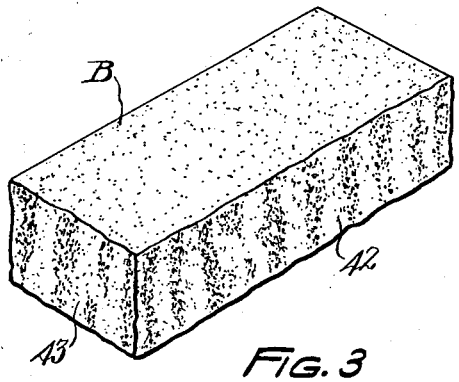

Other objects and features of novelty will appear as I proceed with the description of that embodiment of the apparatus which, for purposes of the present application, I have illustrated in the accompanying drawings, in which Fig. 1 is a diagrammatic elevational view, partly in vertical transverse section, of an apparatus suitable for practicing the invention;

Fig. 2 is a diagrammatic side elevation of the same, partly in section on the line 2—2 of Fig. 1, and Fig. 3 is a perspective view of a brick manufactured in accordance with the invention.

In the manufacture of brick for building construction the clay, after being ground and mixed to produce the desired characteristics, is extruded in a continuous ribbon of a width and thickness corresponding to the length and breadth of the brick, and this ribbon is deposited upon a conveyor moved in the same direction and at the same speed as the extruded ribbon. Any work to be done on the ribbon is performed while it is moving with the conveyor, and this includes the cutting of the ribbon transversely thereof to form individual bricks.

A section of an endless belt conveyor of the kind referred to above is shown in the drawings at 10, traveling over a table or other support 11. The ribbon of clay is illustrated at 12. It may be guided along one side by a rail 13 or the like. The speed of movement of the belt 10 is of course the same as the speed of extrusion of the clay ribbon. As the latter moves along on its conveyor, I subject the top surface and at least one side surface to an operation which tears away from the ribbon a layer of clay. Two things are essential to the invention, namely the removal of a layer of material, and the accomplishment of that removal by a tearing action rather than by a cutting action. The specific apparatus illustrated herein, which is an example of apparatus that may be used for the purposes, is of secondary importance. This apparatus however will now be described more or less in detail.

14 is a shaft mounted transversely of the ribbon 12 and spaced vertically therefrom, being journaled in standards 15. Mounted on the shaft 14 between its bearings there is a wheel or cylinder 16 made up of spaced metal disks 17 with intervening disks 18 of smaller diameter, which serve to separate the disks 17 and leave annular peripheral portions of the latter exposed. On one end of the shaft 14 I may mount a pulley 19 over which runs a driving belt 20.

The distance of the shaft 14 above the conveyor 10 and the ribbon carried thereby will be such as to cause the disks 17 to enter the clay of the ribbon a short distance only, on the average about ¼ inch, although lesser and greater depths may be utilized, as will later appear. Preferably the disks 17 are all of the same diameter, but disks of varying diameters may be utilized if desired. The spacing of the disks 17 is preferably uniform also, and preferably it is about the same as the depth of penetration of the disks into the ribbon. However, other spacing may be used, and the spacing in the same wheel may vary where certain effects are desired.

On one side of the conveyor I mount a vertical shaft 21 in brackets 22. This shaft may carry a pulley 23 to be driven by a belt 24. Between the bearing brackets 22 I mount on the shaft a wheel or cylinder 25 similar to the wheel or cylinder 16 except that it is of shorter length inasmuch as it is designed to act upon one side or edge of the ribbon 12. This wheel comprises disks 26 precisely like the disks 17, and flat circular spacing members 27, like the similar members 18 of wheel 16. The disks 26 enter the clay along the side of the ribbon to substantially the same depth as the disks 17.

In describing the functioning of the apparatus let us first assume that the two wheels 16 and 25 are not positively driven but are free to rotate and are set to engage the moving ribbon 12, as previously described. Now, as the ribbon moves past these wheels the wheels are rotated with a peripheral speed the same as the linear speed of the ribbon. The disks 17 and 26 of course enter the clay, and divide the surface layers on the top and on one side of the ribbon into narrow strips of clay. These strips are squeezed laterally to some extent owing to the thickness of the disks. Each of these narrow strips is engaged on two sides by the disks, while one side only engages the clay ribbon. The adhesion between the disks and these clay strips is strong enough to tear the strips away from the ribbon, and that is precisely what occurs in the operation of the apparatus. The physical make-up of the ribbon is necessarily not absolutely uniform throughout, and the clay may be packed harder in some areas than in others. The tearing will naturally follow the surfaces of least resistance, and hence the separation points will be high in some places and low in others, thereby producing an irregular surface.

If considerable roughness is desired, the disks 17 and 26 are spaced further apart and are caused to enter the clay further than where a finer texture is desired.

Irregular spacing of the disks, and variations in diameter of the disks, when resorted to, will result in greater irregularity of surface in any given brick, but these expedients are not recommended, inasmuch as irregularities due to them are more or less recurrent, and the separate bricks therefore resemble each other to that extent, whereas the effect mainly desired by me, and well accomplished by the invention, is non-uniformity. It will be appreciated that inasmuch as a layer of clay is removed from the top and one side of the ribbon, it is necessary to make the original ribbon just that much higher and wider in order that the finished article may be of standard dimensions.

The narrow strips of clay taken up by the wheels 16 and 25 must be removed in some manner in order that the portions of the disks entering the ribbon may be substantially free from clay. The narrow strips of clay may be stripped from the wheel by fingers 28 engaging the peripheries of spacing disks 18. The clay thus removed from the wheel is pushed over the fingers 28 onto a shelf 29 from which it may be brushed transversely of the machine by suitable means, as for instance by blades 30 attached to an endless belt 31 running over a pair of pulleys 32 mounted on shafts 33 and 34. The shaft 33 is rotatably supported in bearings mounted in standards 35 and at one end carries a pulley 36 which is driven by a belt 37.

Although no strippers are shown for the wheel 25, it is to be understood that strippers of the same kind as those used on the wheel 16 are employed. However, it is not necessary to provide means for carrying away the stripped material, because the strippers are to one side of the conveyor 10 rather than above it, and the strips of material may be permitted to fall directly into any convenient container. All of the stripped material is of course returned to the mill and used in the formation of further ribbon.

After the roughening of the top and side of the clay ribbon has been effected by the means heretofore described, the ribbon must be cut transversely into sections constituting bricks B. This may be accomplished by any one of several well known means during the travel of the ribbon. In Fig. 2 I have illustrated diagrammatically a piece of apparatus for accomplishing this purpose, which comprises a carriage 38 traveling on a track 39 parallel to the conveyor belt 10. In the carriage 38 a frame 40 is mounted for vertical reciprocation. In this frame there are a series of transverse wires 41 spaced apart the thickness of one brick. By any suitable means the carriage 38 is caused to move forward with and at the same speed as the conveyor 10, and at the same time the frame 40 is caused to descend, thereby forcing the wires 41 through the ribbon to cut a series of bricks from the forward end of the ribbon. Thereafter the frame 40 rises and the carriage 38 moves rearward rapidly into position above the forward end of the uncut portion of the ribbon, after which the cycle of operations is repeated. It will be understood that this disclosure of a brick cutting means is illustrative merely and that any other mechanism for accomplishing the same purpose may be substituted therefor.

The two wheels or cylinders 16 and 25 can be rotated exclusively by the movement of the clay ribbon, but because of the drag upon the wheels resulting from the removal of the clay strips it is advisable to use a positive drive.

When the bricks have been completed to the extent that they have been cut from the ribbon, they are removed from the conveyor, after which they are dried and baked in the usual manner. A finished brick is illustrated in Fig. 3. The two surfaces roughened in accordance with the present invention are shown at 42 and 43.

Having thus described my invention, I claim:

1. In apparatus of the character described, means for supporting and moving a clay ribbon, a rotating wheel located opposite the path of movement of the ribbon, said wheel being arranged with its axis transverse to the path of movement of the ribbon and comprising a series of spaced disks mounted at right angles to the axis of the wheel adapted to enter the clay of the ribbon to a shallow depth along an exposed surface thereof and to divide a relatively thin layer thereof into strips which adhere to the disks as the latter leave the ribbon, means for stripping from the wheel the clay removed from the ribbon by said disks, conveyor means onto which the clay stripped from the wheel is delivered, and means for cutting the remainder of the ribbon into bricks.

2. A method of producing brick with an irregular surface, which comprises moving a ribbon of clay longitudinally, progressively gripping the moving ribbon at a plurality of points across an exposed surface thereof, and exerting a pulling force on said gripped portions of the ribbon to tear away a thin layer of material as the ribbon moves forward, and thereafter cutting the remainder of the ribbon into bricks and baking the bricks.

3. A method of producing brick with an irregular surface, which consists in treating a moving ribbon of clay material from which the brick is to be formed by producing closely spaced shallow depressions in a surface of the moving material, progressively tearing away the material between said depressions, and thereafter cutting the remainder of the ribbon into bricks and baking the bricks.

4. A method of producing brick with an irregular surface which consists in treating a moving ribbon of clay material from which the brick is to be formed by producing parallel shallow slots in a surface of the moving material, progressively gripping the strips of material between said slots on the sides of said strips, pulling away the gripped strips by a tearing action, and thereafter cutting the remainder of the ribbon into bricks and baking the bricks.

GEORGE A. GASE.